Aug. 16, 1927.
M. C. TERRY
1,639,444
BALANCING MACHINE
Filed Nov. 11, 1924
2 Sheets-Sheet 1
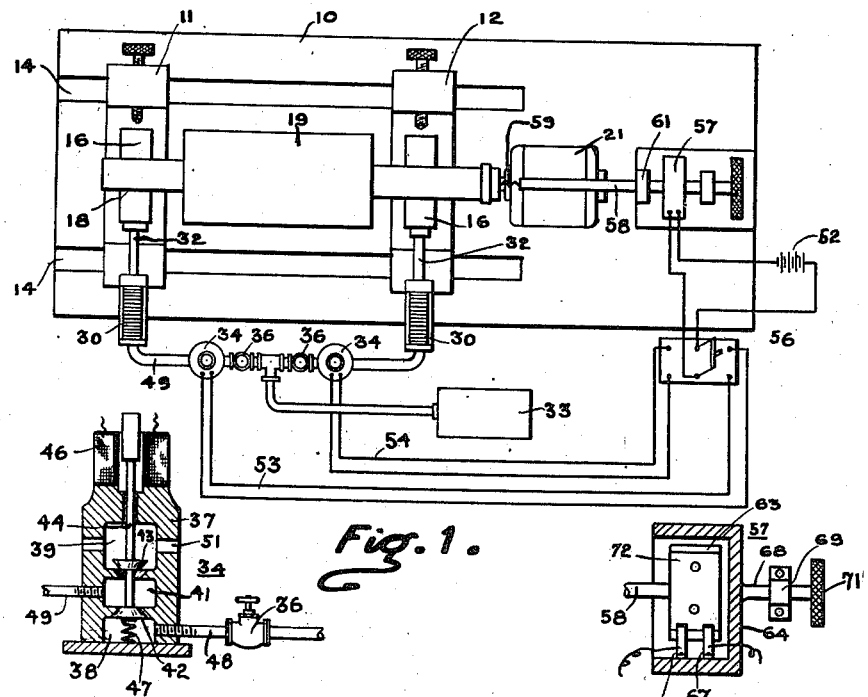
WITNESSES:
M. C. Terry
INVENTOR
BY G. C. Davis
ATTORNEY Aug. 16, 1927.
M. C. TERRY
1,639,444
BALANCING MACHINE
Filed Nov. 11, 1924
2 Sheets-Sheet 2
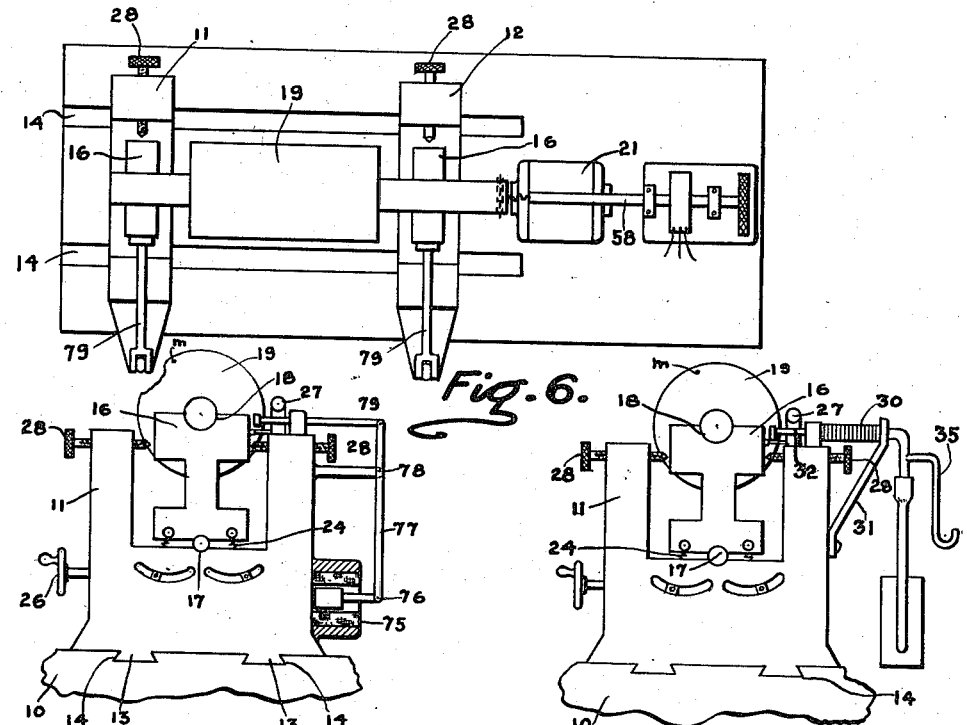
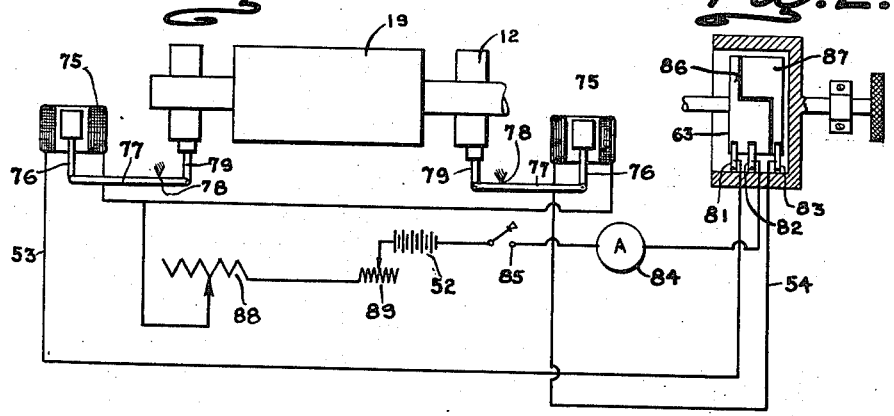
WITNESSES:
M. C. Terry
INVENTOR
BY
ATTORNEY Patented Aug. 16, 1927.

1,639,444

UNITED STATES PATENT OFFICE.

MATSON C. TERRY, OF PHILADELPHIA, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed November 11, 1924. Serial No. 749,261.

My invention relates to balancing machines, more particularly to machines for determining location and magnitude of an unbalanced mass in a rotary body, and has for its object the provision of apparatus of the character designated which shall be simple of operation and which shall be capable of placing a body in running balance quickly and with a high degree of accuracy.

Apparatus made in accordance with my invention is illustrated in the accompanying drawings forming a part of this application in which Fig. 1 is a plan view of a balancing machine embodying my invention and including a diagrammatic view of the electrical circuit employed therewith; Fig. 2 is an end view of the machine illustrated in Fig. 1; Fig. 3 is a side elevation of the same; Fig. 4 is a sectional view of a valve employed with the machine; Fig 5 is a sectional view of the phase-changing device; Fig. 6 is a plan view of a modified form of my invention; Fig. 7 is an end view of the machine illustrated in Fig. 6; Fig. 8 is a diagrammatic view showing the operation of the machine illustrated in Fig. 7 and showing the phase-changing device employed therewith to an enlarged scale; and Fig. 9 is a developed view showing a further modified form of phase-changing device.

In the applications of Alexander T. Kasley, Serial No. 564,731 (filed May 31, 1922) and Serial No. 705,619 (filed April 10, 1924), both assigned to the Westinghouse Electric & Mfg. Co., there are described and claimed balancing machines wherein a force is imposed upon the oscillating body for damping out its oscillations, and mechanical means are provided for varying the phase and magnitude of the imposed force. In accordance with my invention I provide means responsive to the flow of current in an electrical circuit for imposing a corrective force upon the oscillating body, and provide a phase-changing device which greatly simplifies the machine and the process of balancing.

Referring to the drawings, in Figs. 1, 2 and 3, I show a bed plate 10 on which are mounted stationary members or pedestals 11 and 12. The stationary members 11 and 12 are provided with feet 13—13 which fit into longitudinal grooves 14—14 provided in the bed plate 10, thus permitting longitudinal movement of said stationary members to accommodate bodies to be balanced of different lengths.

Associated with each of the stationary members 11 and 12 is a movable support or pendulum member 16. The two supports 16—16 are identical and only one will be described. The support 16 is pivoted in any suitable manner, as at 17, so that it is free to move with respect to the pedestal 11. Bearings are provided at 18 for the shaft of a body 19 to be balanced. A motor 21 is employed to rotate the body 19 during balancing operations, through any suitable driving means, as by the belt 22 shown as bearing directly on a shaft 23 of the body 19. As the body 19 is rotated the forces developed due to its unbalance are imposed upon the movable supports 16 causing them to vibrate around the pivots 17.

In order to increase the sensitiveness of the machine or to magnify the oscillations of the movable supports 16, resilient means, such as springs 24, are interposed between the pedestals 11 and the supports 16, arranged as shown and described in the beforementioned application of Alexander T. Kasley, Serial No. 705,619. The springs 24—24 are provided with adjusting means 26 for varying the effect upon the movable support 16. In order to measure the amplitude of the oscillations of the movable support or pendulum 16, a dial indicator 27 is mounted on the pedestal 11 and bears upon the movable support 16. In balancing operations, one end of the body 19 is balanced at a time and it is necessary that means be provided for holding the opposite movable support 16 against vibrations. For this purpose I show screws 28—28 on each side of the pedestal 11 which may engage and secure the movable support 16.

Assume that the body 19 is in an unbalanced condition and that the location of the unbalanced mass is at $m$ in Fig. 2. Disregarding the element of lag, it will be plain that, as the body 19 is rotated, the pendulum 16 will move to the right or to the left as the point $m$ passes the horizontal plane coincident with the axis of the body 19 at each 180° of revolution. If a force equal and opposite to the force due to rotation of the unbalanced mass $m$ is imposed upon the pendulum member 16 at the instant of the impulse due to unbalance, it is plain that no movement of the pendulum will occur. In accordance with my invention such a force is imposed upon the pendulum 16 in a manner that will now be described.

A fluid pressure motor device 30 of the well-known sylphon bellows type is disposed between each of the stationary members 11 and its associated movable supports 16. For this purpose I show the sylphon bellows device 30 as being supported on the pedestal 11 by a bracket 31 and having a rod 32 bearing against the support 16. Fluid under pressure for operating the sylphon bellows device, usually compressed air, is supplied from a suitable source as from a reservoir 33. Its admission to, and exhaust from the sylphon bellows device 30 is controlled by a double-seated, solenoid-actuated valve mechanism 34. For determining the pressure employed in the sylphon device 30, and hence the magnitude of the force employed in opposition to the force developed due to unbalance of the body, I show a manometric device at 35. The amount of fluid passing through each of the valves 34 is controlled by a throttle valve 36.

In Fig. 4 I show a cross sectional view of the valve mechanism 34. The valve mechanism comprises a housing 37 having an inlet chamber 38, an exhaust chamber 39 and an intermediate chamber 41. Two valve members 42 and 43, operated by a common stem 44, control the flow of fluid through the mechanism. The stem 44 is actuated in a downward direction by an electric solenoid 46 and in an upward direction by a spring 47. Fluid under pressure is admitted to the mechanism from the throttle 36 through a conduit 48, passes to the sylphon bellows device 30 through a conduit 49, and is exhausted from the sylphon bellows device 30 through the ports 51. When the solenoid 46 is energized the valve member 42 is opened and the valve member 43 is closed. Fluid under pressure then passes to the sylphon device 30 from the conduit 48 through the intermediate chamber 41 and the conduit 49. When the solenoid 46 is not energized the spring 47 closes the valve member 42 and opens the valve member 43. Fluid is then exhausted from the sylphon device through the conduit 49, the intermediate chamber 41 and the exhaust port 51.

At 52 is shown a source of electrical energy, for example a battery, and at 53 and 54 electrical circuits for energizing the solenoids 46—46. A double throw switch 56 is employed in order to operate each end of the valve mechanism 34 as desired. Included in the circuit from the source of electrical energy 52 is a commutator 57, a cross sectional view of which is shown in Fig. 5. The commutator 57 is driven in synchronism with the body 19. For this purpose I show a shaft 58 which is flexibly connected to the shaft 23 of the body 19 at 59 and which is journalled in a bearing 61 carried by supports 62 secured to the bed plate 10.

The commutator 57 embodies a rotating member 63, a brush holder 64 and brushes 66 and 67. The brush holder 64 is attached to a shaft 68 which is journalled in bearings 69, carried by supports 62. The brush holder 64 is rotatable with respect to the rotating member 63 and manual means 71 are provided whereby it may be turned to any desired relation to the rotating member 63. The rotating member 63 is made of insulating material and is provided at 72 with a segment of conducting material so that, as the shaft rotates the brushes 66 and 67 contacting and leaving said segment serve to open or close the electrical circuit 53 or 54, as the case may be, and operate either of the valve mechanisms 34 in timed relation to the rotation of the body 19. By rotating the brush holder 64 the completion of the circuit and operation of the valve mechanism 34 and sylphon device 30 may be brought in direct opposition to the force due to unbalance in the body 19 as by rotation of the unbalanced mass in Fig. 2. The rotating member 63 and the shaft 23, being directly coupled, and their relative positions known, by noting the relative positions of the brush holder 64 and the rotating members 63 at termination of the operation, the angular location of the unbalanced mass $m$ may be observed.

The operation of the apparatus so far described is as follows: The body 19 is mounted as shown and, with each end free to vibrate, is rotated and its condition of balance noted on the dial indicators 27. If the body is found to be in an unbalanced condition, one of the movable supports is secured by means of the appropriate screws 28, the switch 56 is thrown to operate the valve mechanism 34 associated with the free support, and the throttle 36 is opened slightly. As the valve mechanism 34 operates in response to the periodic completion of its associated electrical circuit to admit fluid under pressure to, and exhaust it from the device 30, the force exerted by said sylphon bellows device is imposed upon the movable support 16, tending to force it to the left during a part of each revolution of the body 19. The brush holder 64 is next turned until the dial indicator shows the least movement of the support 16 at which time the force exerted by the sylphon bellows device is opposite the force due to unbalance. The throttle 36 is next opened until the force exerted by the sylphon bellows device is sufficient to damp out movement of the support 16 toward the right. The pressure employed is next noted on the manometric device 35 and the angular location of the unbalanced mass noted as before described.

When one end has been tested in the manner described, the movable support 16 at said end is secured and the opposite end of the body tested in the same manner, after which the magnitude and location of the final corrective weights to be applied, or material to be removed, is calculated in a manner well known in the art and the body is placed in final running balance.

In accordance with the modification of my invention illustrated in Figs. 6, 7 and 8 I oppose the forces due to the unbalanced condition of the body 19 in rotation by means of electro-magnetic impulses produced in the solenoids without the intermediary fluid pressure motor 30 illustrated in Figs. 1 to 5, inclusive.

In the drawings like parts to those illustrated in Figs. 1 to 5 have the same reference numerals and require no further description.

Referring to Figs. 6 and 7, the stationary supports 11 and 12 each carry a solenoid 75, the core of which is attached at 76 to a lever 77, fulcrumed at 78 and connected, at its opposite end, to a rod 79 arranged to bear against the movable support or pendulum member 16. When the solenoid 75 is energized, its core moves outwardly, imposing a force upon the movable support or pendulum member 16 through the lever 77 and the rod 79.

Referring to Fig. 8, the brush holder 64 of the commutator 57 has three brushes 81, 82 and 83. The brush 82 is connected to an electrical measuring device such as an ammeter 84 which is, in turn, connected to a switch 85 controlling the circuit from the source of electrical energy 52. The brush 81 is connected to the electrical circuit 53 and the brush 83 is connected to the electrical circuit 54, said circuits leading to the two solenoids 75, 75 at opposite ends of the apparatus respectively.

The rotating member 63 is provided with two interlocking rings of conducting material 86 and 87 which are insulated from each other. The brush 81 bears continuously on the ring 86 and the brush 83 bears continuously on the ring 87. The brush 82 bears on the ring 86 during approximately 180° of revolution of the rotating member 63 and on the ring 87 for approximately 180° of revolution. It will be seen, therefore, that the circuits 53 and 54 are alternately completed and that each of the solenoids is energized during approximately 180° of revolution. At the instant that the dividing line between the two rings 86 and 87 is passing beneath the brush 82, said brush bears upon both of the rings 86 and 87. This serves to prevent sparking at the brush 82 and does not seriously affect the operation of the ammeter 84. At 88 is shown a main rheostat and at 89 a vernier rheostat, said rheostats being common to both of the circuits 53 and 54 and serving to vary the flow of electrical current through said circuits.

The operation of apparatus made in accordance with this modification is as follows: With both of the pendulum members 16 free to vibrate, the body 19 is rotated and its condition of balance noted. If the body is found to be in an unbalanced condition, one of the pendulum members 16 is secured against vibrations by means of the screws 28—28 and the switch 85 is closed, permitting the solenoids 75 to be energized alternately during each 180° of revolution. Inasmuch as one of the members 16 is held against movement during balancing operations, its associated solenoid is at that time ineffective, while the solenoid associated with the free pendulum member 16 imposes upon said member an impulse in response to the flow of electrical energy through the solenoid for approximately 180° of each revolution of the body.

The brush holder 63 is next turned until the dial indicator 27 shows the least amplitude of movement of the pendulum 16 at which time the impulses imposed by the solenoids 75 are opposite to the force developed by rotation of the unbalanced mass $m$ of the body 19. The rheostats 88 and 89 are next adjusted so as to damp out all movements of the members 16 to the right as shown in Fig. 7. The amount of current required to overcome movement of the pendulum 16 due to the unbalanced condition of the body 19 is next read on the ammeter 84, from which is calculated the amount of unbalance existing. The ammeter 84 may be calibrated in terms of some convenient unit, such as inch ounces, and thus obviate the necessity of calculation. The location of the plane of unbalance with respect to a given circumferential point on the body 19 is observed in the same manner as described with respect to the previous modification.

After having tested one end of the body 19 and its condition of unbalance determined, the opposite end is tested in the same manner and the final corrective weights or material to be removed necessary to put it in a balanced condition is calculated in a manner well known in the art.

While I have found that in balancing heavy bodies an impulse having a duration of approximately 180° of revolution, employed in the damping out of oscillations due to unbalance is more preferable to employ, under most conditions, than one of shorter duration, it will be plain that the conducting rings and the brushes of the commutator 57 may be so arranged as to employ an impulse of any desired duration. For example, I show in Fig. 9 a developed view of the rotating element 63 of the commutator 57 as having two rings of conducting material 91 and 93 and a segment 92 of conducting material and having brushes 94, 95, 96 and 97, bearing thereon. In this arrangement a circuit 98 is employed in addition to the circuits 53 and 54 heretofore described, the circuit 98 passing through a fixed resistance 99 equal to the resistance to the current flow by each of the solenoids 75—75. In this modification the brush 94 bears continually on the conducting ring 91, the brush 95 leading from the source of electrical energy 52 bears alternately on the rings 91 and 93 and the segment 92. The brush 97 bears continually on the ring 93. The ring 93 has an offset portion 93' over which a segment 101 of non-conducting material is fitted, said segment extending over 90° of the circumference of the rotating element 63. It will be seen from the drawing that during 90° of a revolution current flows from the battery 52, through the brush 95, the ring 91 and the brush 94 through the circuit 53 and solenoid 75 at the left. During 180° of the revolution it flows through the brush 95, the segment 92, the brush 96 and through the circuit 98. During the other 90° of the revolution current flows through the brush 95, the ring 93, and brush 97, through the circuit 54 and solenoid 75 at the opposite end of the machine. By employing such a commutator as I have just described, an impulse having a duration of 90° of revolution actuates each of the solenoids 75—75 and an impulse having a duration of 180° passes through the circuit 98 and the fixed resistance 99. It will be plain that by varying the outline of the conducting rings and of the non-conducting segment an impulse may be employed of any desired duration.

From the foregoing it will be apparent that I have invented an improved balancing machine wherein corrective impulses responsive to the flow of energy in an electrical circuit are employed to oppose the impulses due to unbalance of a body in rotation, and that I have provided simple, effective means for varying the phase and magnitude of the corrective impulses.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a balancing machine, a stationary member, a movable member for supporting a body to be balanced, means for rotating the body, mechanism cooperating between the stationary member and the movable member for resisting movement of the movable member due to the unbalanced condition of the body an electrical circuit, and means responsive to the flow of current in the electrical circuit for controlling the application of energy to said mechanism.

2. In a balancing machine, a stationary member, a movable member for supporting a body to be balanced, means for rotating the body, mechanism cooperating between the stationary member and the movable member for resisting movement of the movable member due to the unbalanced condition of the body, an electrical circuit, means responsive to the flow of current in the electrical circuit for controlling the application of energy to said mechanism, and means for opening and closing said circuit in timed relation to the rotation of the body.

3. In a balancing machine, a stationary member, a movable member for supporting a body to be balanced, means for rotating the body, mechanism carried by the stationary member for resisting movement of the movable member due to the unbalanced condition of the body, an electrical circuit, means responsive to the flow of current in the electrical circuit for controlling the application of energy to said mechanism, means for opening and closing said circuit in timed relation to the rotation of the body, and means for varying the time of opening and closing of said circuit with respect to the position of a given circumferential point on said body.

4. In a balancing machine, a stationary member, a movable member for supporting a body to be balanced, means for rotating the body, mechanism carried by the stationary member for resisting movement of the movable member due to the unbalanced condition of the body, an electrical circuit, means responsive to the flow of current in the electrical circuit for controlling the application of energy to said mechanism, means for opening and closing said circuit in timed relation to the rotation of the body, means for varying the time of opening and closing of said circuit with respect to the position of a given circumferential point on said body, and means for determining the relation between the time of application of energy to said mechanism and the position of said circumferential point.

5. In a balancing machine, a stationary member, a movable member for supporting a body to be balanced, means for rotating the body, mechanism cooperating between the stationary member and the movable member for resisting movement of the movable member due to the unbalanced condition of the body, an electrical circuit, means responsive to the flow of current in the electrical circuit for controlling the application of energy to said mechanism, means for opening and closing said circuit in timed relation to the rotation of the body, means for varying the time of opening and closing of said circuit with respect to the position of a given circumferential point on said body, means for determining the relation between the time of application of energy to said mechanism and the position of said circumferential point, and means for measuring the amount of energy applied.

6. In a balancing machine, a stationary member, a movable member for supporting a body to be balanced, means for rotating the body, mechanism cooperating between the stationary member and the movable member for resisting movement of the movable member due to the unbalanced condition of the body, an electrical circuit, means responsive to the flow of current in the electrical circuit for controlling the application of energy to said mechanism, and means for opening and closing said circuit in timed relation to the rotation of the body, said means comprising a shaft rotating in synchronism with the body and a commutator associated with the shaft and included in the circuit.

7. In a balancing machine, a stationary member, a movable member for supporting a body to be balanced, means for rotating the body, mechanism carried by the stationary member for resisting movement of the movable member due to the unbalanced condition of the body, an electrical circuit, means responsive to the flow of current in the electrical circuit for controlling the application of energy to said mechanism, means for opening and closing said circuit in timed relation to the rotation of the body, and means for varying the time of opening and closing of said circuit with respect to the position of a given circumferential point on said body, said means comprising a shaft rotating in synchronism with the body, a commutator associated with the shaft and included in the circuit, and having a brush holder rotatable with respect to said shaft.

8. In a balancing machine, a pair of stationary members, a movable support for each end of a body to be balanced and associated with each of said stationary members respectively, means for rotating the body, means actuated by a solenoid cooperating between each of the stationary members and its associated movable support for resisting movement of the supports due to unbalance of the body, an electrical circuit for energizing each of the solenoids, and means for alternately effecting a flow of current through said solenoids during rotation of the body.

9. In a balancing machine, a pair of stationary members, a movable support for each end of a body to be balanced and associated with each of said stationary members respectively, means for rotating the body, means actuated by a solenoid cooperating between each of the stationary members and its associated movable support for resisting movement of the supports due to unbalance of the body, an electrical circuit for energizing each of the solenoids, means for effecting a flow of current of a predetermined duration alternately through said circuits during rotation of the body, and means for varying the phase of the current impulses through said solenoids with respect to the position of a given point on the body.

10. In a machine having an oscillating member, means for supporting a body for rotation on said member, means for imposing upon said member a corrective electro-magnetic force in different phases with respect to the rotation of the supported body, and means for varying the magnitude of said force.

11. In a machine having a stationary and an oscillating member, means for supporting a body for rotation on the oscillating member, means coacting between the stationary and the oscillating member for imposing upon said oscillating member a corrective electro-magnetic force in different phases with respect to the rotation of the supported body, and means for varying the magnitude of said force.

12. In a machine having a stationary and an oscillating member, means for supporting a body for rotation on the oscillating member, means coacting between the stationary and the oscillating member for imposing upon said oscillating member a corrective electro-magnetic force in different phases with respect to the rotation of the supported body, means for varying the magnitude of said force, and means for measuring the magnitude of said force.

13. In a balancing machine, the combination of a stationary member, a movable support for a body to be balanced, means for rotating the body whereby the forces due to unbalance are imposed upon the movable support, an electro-motor device coacting between the movable support and the stationary member for developing a force in opposition to the force due to unbalance, and means for energizing said electro-motor device in timed relation to the rotation of the body.

14. In a balancing machine, the combination of a stationary member, a movable support for a body to be balanced, means for rotating the body whereby the forces due to unbalance are imposed upon the movable support, an electro-motor device coacting between the movable support and the stationary member for developing a force in opposition to the force due to unbalance, means for energizing said electro-motor device in timed relation to the rotation of the body, and means for varying the phase of the force developed by the electro-motor device with respect to the position of a given circumferential point on said body.

15. In a balancing machine, the combination of a stationary member, a movable support for a body to be balanced, means for rotating the body whereby the forces due to unbalance are imposed upon the movable support, an electro-motor device coacting between the movable support and the stationary member for developing a force of predetermined duration in opposition to the force due to unbalance, means for energizing said electro-motor device in timed relation to the rotation of the body, means for varying the phase of the force developed by the electro-motor device with respect to the position of a given circumferential point on said body, and means for varying the magnitude of said force.

16. In a balancing machine, the combination of a stationary member, a movable support for a body to be balanced, means for rotating the body whereby the forces due to unbalance are imposed upon the movable support, an electro-motor device coacting between the movable member and the stationary member for developing a force in opposition to the force due to unbalance, means for energizing said electro-motor device in timed relation to the rotation of the body, means for varying the phase of the force developed by the electro-motor device with respect to the position of a given circumferential point on said body, means for varying the magnitude of said force, and means for measuring the force developed by its said electro-motor device.

17. In a balancing machine, the combination of a pair of stationary members, a movable support for each end of a body to be balanced and associated with each of said stationary members respectively, means for rotating the body whereby the forces due to unbalance are imposed upon the movable supports, an electro-motor device coacting between each of the stationary members and its associated movable support for imposing a force on the movable support in opposition to the forces due to unbalance of the body, means for energizing said electro-motor device in timed relation to the rotation of the body, means for varying the phase of said force with respect to the position of a given circumferential point on said body, and means for varying the magnitude of said force.

18. In a balancing machine, the combination of a pair of stationary members, a movable support for each end of a body to be balanced and associated with each of said stationary members respectively, means for rotating the body whereby the forces due to unbalance are imposed upon the movable supports, an electro-motor device coacting between each of the stationary members and its associated movable support for imposing a force upon the movable support in opposition to the forces due to unbalance of the body, means for energizing said electro-motor device in timed relation to the rotation of the body, means for varying the phase of said force with respect to the position of a given circumferential point on said body, means for varying the magnitude of said force, and means for measuring the electro-motive force employed in energizing said device.

19. In a balancing machine, a pair of stationary members, a movable support for each end of a body to be balanced and associated with each of said stationary members, respectively, resilient means between the stationary members and the movable supports, means for rotating the body whereby the forces due to unbalance are imposed upon the movable supports, a solenoid coacting with each of the stationary members and its associated movable support for imposing a force upon the movable support in opposition to the forces due to unbalance of the body, a source of electrical energy, a circuit from said source through each of said solenoids, a commutator rotating in synchronism with the body for alternately effecting a flow of current through said solenoids, means for advancing or retarding the phase of the current impulses through said solenoids with respect to the position of a given circumferential point on the body, a rheostat for varying the flow of current through said circuits, and an electrical measuring device for measuring the flow of current through said circuits.

20. In a balancing machine, a pair of stationary members, a movable support for each end of the body to be balanced and associated with each of said stationary members, respectively, resilient means between the stationary member and the movable supports, means for rotating the body whereby the forces due to unbalance are imposed upon the movable supports, a solenoid coacting with each of the stationary members and its associated movable support for imposing a force upon the movable support in opposition to the forces due to unbalance of the body, a source of electrical energy, a circuit from said source through each of said solenoids, a commutator rotating in synchronism with the body and common to said circuits for alternately effecting a flow of current through said solenoids, means for advancing or retarding the phase of the current impulses through said solenoids with respect to the position of a given circumferential point on the body, a rheostat common to said circuits for varying the flow of current therethrough, and an electrical measuring device common to said circuits.

In testimony whereof, I have hereunto subscribed my name this 22nd day of October 1924.

MATSON C. TERRY.